United States Patent [19]

Ophey et al.

[11] Patent Number: 5,694,247
[45] Date of Patent: Dec. 2, 1997

[54] OPTICAL TRANSMISSIVE COMPONENT WITH ANTI-REFLECTION GRATINGS

[75] Inventors: Willem G. Ophey; Johannes J. Baalbergen; Johannes M. Oomen; Petrus G. J. M. Nuyens, all of Eindhoven, Netherlands

[73] Assignee: U.S. Philips Corporation, New York, N.Y.

[21] Appl. No.: 432,357

[22] Filed: May 1, 1995

[30] Foreign Application Priority Data

May 2, 1994 [EP] European Pat. Off. ............ 94201218

[51] Int. Cl.$^6$ ........................................... G02B 5/18
[52] U.S. Cl. .................. 359/566; 359/569; 359/570; 359/574
[58] Field of Search ...................... 359/569, 570, 359/573, 575, 576, 566, 558, 574

[56] References Cited

U.S. PATENT DOCUMENTS

| | | | |
|---|---|---|---|
| 4,668,056 | 5/1987 | Braat et al. | 359/719 |
| 5,007,708 | 4/1991 | Gaylord et al. | 359/569 |
| 5,085,496 | 2/1992 | Yoshida et al. | 359/567 |
| 5,098,184 | 3/1992 | Van Den Brandt et al. | 353/102 |
| 5,122,903 | 6/1992 | Aoyama et al. | 359/575 |
| 5,184,248 | 2/1993 | De Vaan et al. | 359/483 |
| 5,235,444 | 8/1993 | De Vaan | 359/40 |
| 5,237,435 | 8/1993 | Kurematsu et al. | 359/573 |
| 5,357,591 | 10/1994 | Jiang et al. | 359/575 |
| 5,417,799 | 5/1995 | Daley et al. | 216/24 |

FOREIGN PATENT DOCUMENTS

| | | | |
|---|---|---|---|
| 0383386 | 8/1990 | European Pat. Off. | G11B 11/10 |
| A1-252902 | 10/1989 | Japan | 359/569 |
| A2-178604 | 7/1990 | Japan | 359/569 |
| 1002611 | 8/1965 | United Kingdom | 359/569 |

OTHER PUBLICATIONS

T.K. Gaylord et al. "Zero–reflectivity high spatial–frequency rectangular–groove dielectric surface–relief gratings", Applied Optics, vol. 25, No. 24, 15 Dec. 1986, pp. 4562–4567.

G. Boushuis & P. Burgstede, "The optical scanning system of the Philips 'VLP' record player", Philips Tech. Rev. 33, No. 7, 1973, pp. 186–189.

Primary Examiner—Paul M. Dzierzynski
Assistant Examiner—John Juba, Jr.
Attorney, Agent, or Firm—Daniel E. Tierney

[57] ABSTRACT

An optical transmissive component (1) is described, which component has an entrance surface (4) and an exit surface (5) for optical radiation (20), in which one of the surfaces (4; 5) is provided with an anti-reflection grating (10; 15). By providing a second surface, (5; 4) with a second anti-reflection grating and by ensuring that the grating strips (11) of the first grating (10) extend essentially perpendicularly to those (16) of the second grating (15) in corresponding areas of the first and the second surface (4; 5), it is prevented that the component is birefringent.

10 Claims, 4 Drawing Sheets

OPTICAL TRANSMISSIVE COMPONENT WITH ANTI-REFLECTION GRATINGS

The invention relates to an optical transmissive component having an entrance surface and an exit surface for optical radiation, in which one of the surfaces is provided with an anti-reflection grating. The invention also relates to an optical system, for example an optical scanning device provided with at least one component of this type.

BACKGROUND OF THE INVENTION

It is known, for example from the article "Zero reflectivity high-spatial frequency rectangular groove dielectric surface relief gratings" in "Applied Optics", vol. 25, no. 24, 15 Dec. 1986, pp. 4562–7, that a surface of an optical component can be given a reflection coefficient which is substantially equal to zero by providing a phase grating in the form of a periodical groove-shaped structure having a small period on this surface. Such a grating can be used to great advantage instead of an anti-reflection coating which is obtained by successive vapour deposition of one or more layers having a specific refractive index and a specific thickness on a surface. An anti-reflection grating is suitable for a wider wavelength range, is better resistant to changes in ambient parameters such as temperature and humidity and may be provided more rapidly and at lower cost than an anti-reflection coating.

As is described in said article in "Applied Optics", an anti-reflection grating exhibits birefringence, that is to say, the optical path length for the TM component of the transmitted radiation is different from the optical path length for the TE component of this radiation. The vibration direction of the TE component is parallel to the direction of the grating grooves, while the vibration direction of the TM component is perpendicular to the direction of the grating grooves. This path length difference can be expressed in a phase difference between the components emerging from the grating. In said article in "Applied Optics" it is noted that the birefringence may be so large that the grating structure may function as a wideband $\lambda/4$ plate in which $\lambda$ is the radiation wavelength.

In an optical system having a component which is provided with an anti-reflection grating, birefringence of this grating, leading to a phase difference of the order of some up to ten degrees, may be accepted under circumstances. If the birefringence is larger or if a plurality of such components should have to be used in a system so that the total birefringence would also become too large, the use of anti-reflection gratings will cause problems. This is particularly, but not exclusively the case in reading devices for magneto-optical record carriers, in which devices magnetic domains in the record carrier are detected by measuring a small polarization rotation caused by these domains in the scanning beam.

SUMMARY OF THE INVENTION

It is an object of the present invention to mitigate the drawback of birefringence while maintaining the advantages of anti-reflection gratings.

An optical component according to the invention is characterized in that a second surface is provided with a second anti-reflection grating and in that the grating strips of the first grating extend essentially perpendicularly to those of the second grating in corresponding areas of the first and the second surface.

At a mutually perpendicular orientation of the strips of the first and the second grating, these gratings compensate their birefringence completely and the component itself no longer exhibits any birefringence. If, dependent on the application, a small birefringence is permitted, the grating strips of the two gratings need not be exactly perpendicular to each other but they may extend at a small angle to each other.

A first embodiment of the component according to the invention is characterized in that the two anti-reflection gratings are linear gratings having straight grating strips.

An alternative embodiment, which is preferred if the component has a curved and rotationally symmetrical entrance and exit surface, is characterized in that the grating strips of one of the anti-reflection gratings are circular and those of the other anti-reflection grating extend radially and essentially perpendicularly to the axis of symmetry.

Due to this arrangement of the grating strips a better symmetrical distribution of the grating strips on the entrance surface and the exit surface can be obtained, rather than when using straight grating strips.

This embodiment of the invention may be further characterized in that the grating having the radially extending grating strips is divided into a plurality of rings and in that the rings succeeding each other from the centre towards the edge of the grating have an increasing number of grating strips.

The anti-reflection gratings, which are phase gratings, may be implemented as refractive index gratings, for example volume holograms and comprise strips alternately having a higher and a lower refractive index.

However, the optical component is further preferably characterized in that the anti-reflection gratings are profile gratings.

These profile gratings can be easily provided on the surfaces of the component by means of moulds having the desired profile structures, for example by means of a known replica process.

A first specific embodiment of the component is further characterized in that the anti-reflection gratings are present in thin layers of a transparent synthetic material, which layers are provided on the entrance surface and the exit surface, respectively.

The synthetic material layers comprise, for example polymethyl methacrylate (PMMA) or polycarbonate (PC) and have a refractive index which approximates that of the component material as much as possible. The synthetic material can be provided in a sufficiently viscous state on the component, whereafter the desired grating profile structure is impressed by means of a mould and subsequently the synthetic material is cured, for example by means of ultraviolet radiation. The synthetic material layers are so thin that they do not substantially influence the optical quality of the component.

A second specific embodiment of the optical component is further characterized in that the anti-reflection gratings are provided in the entrance surface itself and the exit surface itself, respectively.

Notably when the component itself is made by means of moulds in which the shape of the component has been provided, this embodiment is preferred because shaping of the component and providing the anti-reflection gratings on the surfaces can be carried out by giving these moulds not only the desired shape but also the grating structure.

The invention also relates to an optical system for guiding and performing optical operations on a radiation beam, which system has at least one discrete component. This system is characterized in that at least one component is implemented as described hereinbefore.

Examples of optical operations are changing the convergence or divergence of a radiation beam, splitting a radiation beam into a plurality of sub-beams, changing the direction of propagation of the beam, changing the state of polarization of the beam, etc.

The invention can be used to great advantage in a scanning device for reading and/or writing an optical record carrier, in which device an efficient use of the available radiation of, for example a diode laser must be made and in which false reflections must be prevented from occurring, notably in the direction of the diode laser or in the direction of the detectors in this device.

Such a scanning device according to the invention, which is provided with a radiation source, a radiation-sensitive detection system and an optical system for guiding radiation from the radiation source to the detection system via the record carrier is characterized in that the optical system is a system as described hereinbefore.

Since optical components made antireflective according to the invention do not bring about any extra change of polarization in a beam, said optical system is very suitable for a scanning device in which polarization rotation of the scanning beam is used for reading, for example a magneto-optical scanning device.

BRIEF DESCRIPTION OF THE DRAWINGS

These and other aspects of the invention will be apparent from and elucidated with reference to the embodiments described hereinafter.

In the drawings

DETAILED DESCRIPTION OF THE INVENTION

Figure 1:
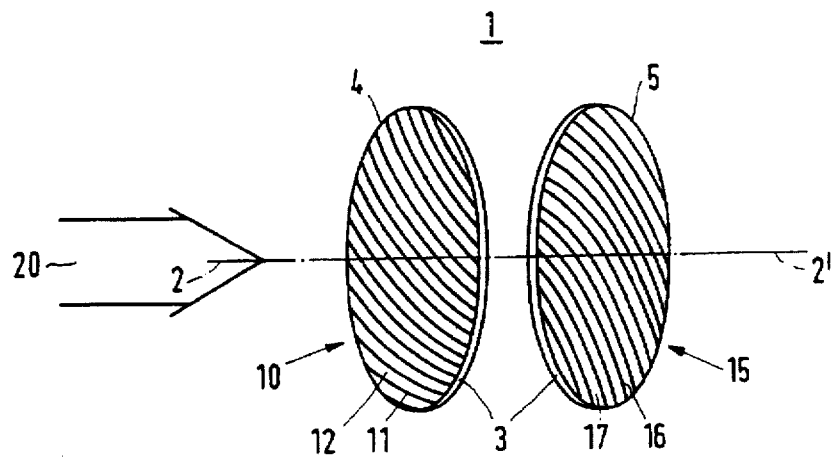
FIG. 1 shows an embodiment of a lens element according to the invention.

FIG. 1 shows a lens element 1 in which for the sake of clarity the imaginary front and rear portions are shown separate from each other and rotated with respect to each other about an axis perpendicular to the optical axis 2-2" of the lens element. In reality these portions form one assembly. The lens element comprises a lens body 3 having an entrance surface 4 and an exit surface 5 for radiation 20 coming from the left. To prevent a portion of the incident radiation from being reflected to the left, the entrance surface 4 is provided with a grating 10 alternately comprising grating grooves 11 and intermediate grating strips 12.

This grating is, for example a linear grating having parallel grating grooves and intermediate strips.

Figure 2:
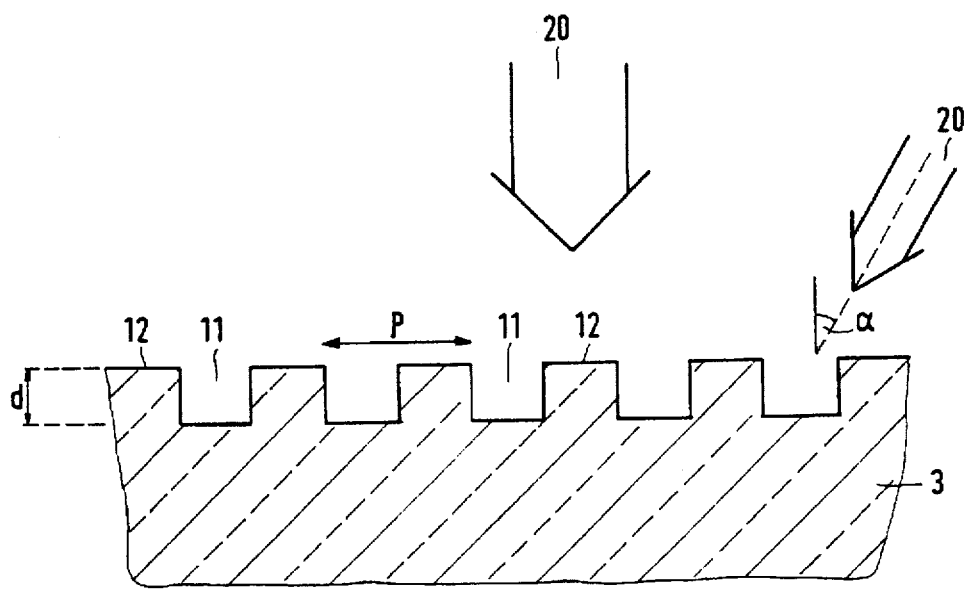
FIG. 2 shows a small portion of this lens element in a cross-section.

FIG. 2 shows a small portion of the grating in a cross-section perpendicular to the direction of the grating grooves 11. FIG. 2 shows a rectangular grating profile. However, the grating profile may alternatively be triangular, sinusoidal, trapezoidal, etc. The operation of such an anti-reflection grating is described in, for example the above-mentioned article in Applied Optics, 15 Dec. 1986, pp. 4562–7. For an optimal antireflective effect for radiation 20 having a wavelength of approximately 800 nm, the groove depth d must be between 150 nm and 500 nm, dependent on the profile shape and refractive index of the grating medium, if the refractive index of the lens material is 1.57. For perpendicularly incident radiation the period p of the grating must be smaller than 500 nm. The grating period p must be such that there is no diffraction upon passage through the grating. From the general grating equation for the first order:

$$N_1 \sin i + N_2 \sin u = \lambda/p$$

in which $N_1$ is the refractive index of the surrounding medium, $N_2$ is the refractive index of the medium in which the grating is provided, i is the angle of incidence of the radiation, u is the angle at which the radiation exits, it follows for perpendicular incidence, i.e. for sin i=0 that $$N_2 \sin u = \lambda/p$$

In order that no first-order beams are produced, the above-mentioned equation should satisfy:

sin u>1, zodat/so that $\lambda/N_2 p > 1$ of./or, $p < \lambda/N_2$

Such a fine grating structure has birefringence, i.e. it shows for TM-polarized radiation another optical path length than for TE-polarized radiation. The residual reflection of the grating for both TM and TE-polarized radiation may be smaller than 0.3%.

At a non-perpendicular incidence of the radiation 20 on the grating, the period p should be smaller for a sufficient antireflective effect than for perpendicular incidence. At an angle of incidence α=45°, for example, for the border rays of a converging or a diverging beam, the grating period will have to be smaller than, for example 350 nm. The phase difference between TE and TM-polarized radiation caused by birefringence of such a grating may increase to 20°, dependent on the shape of the grating profile and the refractive index of the grating medium. Notably in a scanning device for magneto-optical record carriers, the use of a lens or another optical component having such a grating causes problems. In optical systems in general, the total birefringence caused by the different gratings would become unacceptably large if a plurality of components were to be provided with such an anti-reflection grating.

Figure 3A:
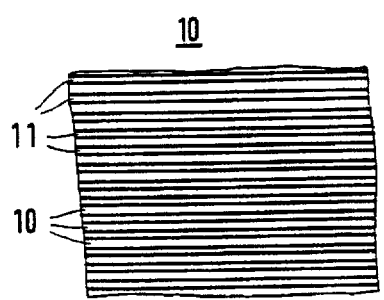
FIGS. 3a and 3b show a first embodiment of the gratings to be provided on an entrance surface and an exit surface of an optical component.
Figure 3B:
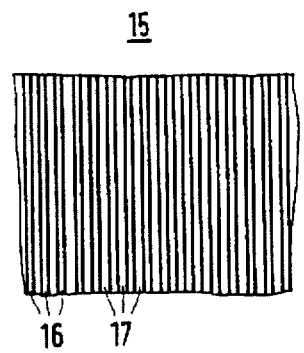

To avoid these problems, a second anti-reflection grating 15 similar to the grating 10 is provided on the exit surface 5, but this grating has its direction of the grating grooves 16 and intermediate strips 17 perpendicular to that of the grating 10 as is shown in FIGS. 3a and 3b. These Figures show small, corresponding portions of the gratings of FIG.

1 projected in a plane. The grating 15 introduces a birefringence of the same order as that of the grating 10. The polarization vector of the grating 15 is, however, perpendicular to that of the grating 10 so that the birefringence of the grating 10 is compensated by that of the grating 15. This means that the phase difference between TE and TM-polarized radiation caused upon passage through the first grating is eliminated because an equally large but opposite phase difference is produced upon passage through the second grating.

Thus, a lens component is obtained whose surfaces have substantially no reflection and substantially no birefringence. This lens component is antireflective for radiation incident from the left and from the right, which is important for, for example optical scanning devices in which radiation from the radiation source is reflected by the surface to be scanned towards a detector and then passes through such a lens component twice.

Under circumstances, it may be allowed for the component to have a small birefringence.

Figure 4A:
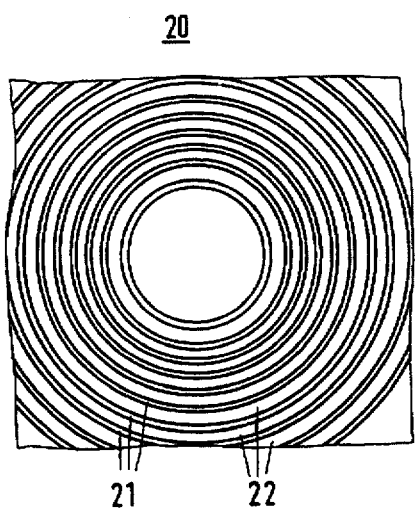
FIGS. 4a, 4b and 4c show second embodiments of these gratings.
Figure 4B:
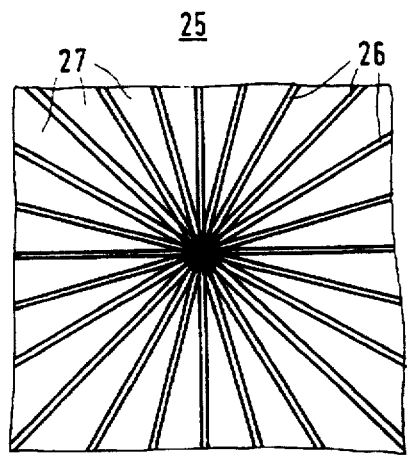
Figure 4C:
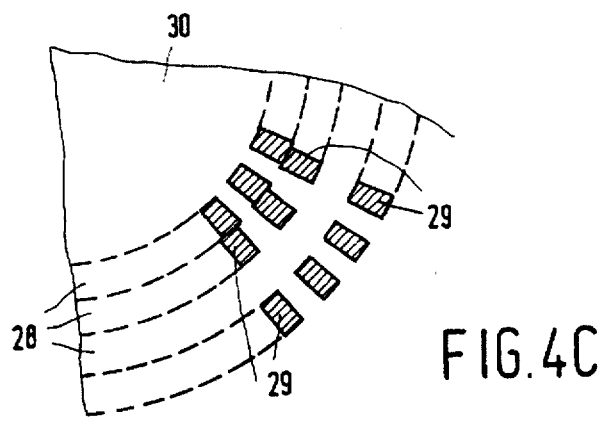

The linear gratings with straight grating strips shown in FIGS. 3a and 3b are most suitable for optical components having flat entrance and exit surfaces such as, for example prisms, wedges or plane-parallel plates. For components having curved rotationally symmetrical surfaces, such as the lens element of FIG. 1, grating structures, portions of which are shown in FIGS. 4a and 4b are preferably used. The grating 20 for one of the surfaces has circular grating grooves 21 and intermediate strips 22, while the grating 25 for the other surface has radially extending grating grooves 26 and intermediate strips 27 from the centre M of this surface. The point M is the point at which the optical axis of the component intersects said surface. Since the grating 20 has circular grooves, the period of the grating throughout the surface may be constant. For the grating 25 the grating period increases from the centre M towards the edge. Particularly for larger components, the grating surface may be divided into a plurality of rings 28, as is shown in FIG. 4c, and an increasing number of grating strips may be provided in the rings succeeding each other from the centre towards the edge. For a sufficiently large number of rings, the number of grating strips 29 may gradually increase so that a reasonably uniform distribution of the grating strips on the surface can be obtained. FIG. 4a shows only some rings in a grating sector. In reality, the number of rings is considerably larger.

It is to be noted that for the sake of clarity only some grating grooves are shown in FIGS. 4a, 4b and 4c and in FIGS. 1 and 3a, 3b. In reality, the gratings have grooves in a number of the order of 3000 per mm.

Figure 5:
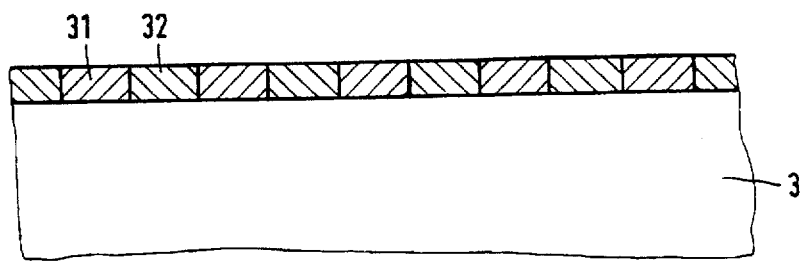
FIG. 5 shows a small portion of a component having a refractive index grating in a cross-section.

Gratings with grooves, i.e. relief or profile gratings have hitherto been described. However, the anti-reflection gratings may be implemented as refractive index or volume gratings. These are gratings alternately comprising strips 31 having a higher refractive index and strips 32 having a lower refractive index, as is shown in FIG. 5. This Figure shows in a cross-section a portion of a surface of an optical component which is provided with a refractive index reflection grating 30. Such a grating may be provided on the relevant surfaces by means of, for example ion implantation.

Figure 6:
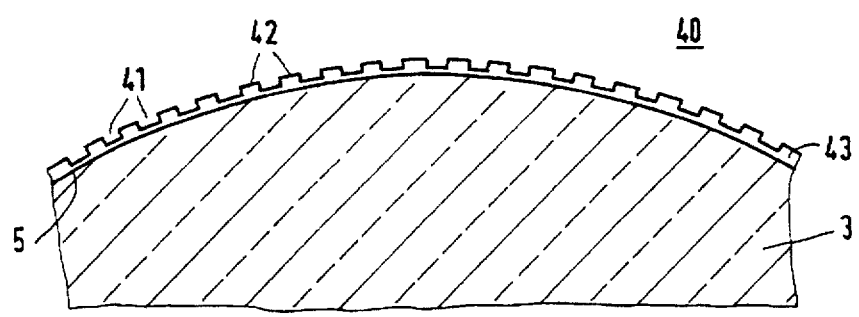
FIG. 6 shows a small portion of a component with a grating provided in a synthetic material layer.

A rapid and inexpensive, hence advantageous process for providing profile anti-reflection gratings consists of providing a thin layer of transparent synthetic material, such as polymethyl methacrylate (PMMA) or polycarbonate (PC) which is in a sufficient viscous state, on the surface of the optical component, subsequently pressing a mould having a profile which is the mirror image of the desired grating structure into the layer and causing the layer to cure, for example by means of ultraviolet radiation or under the influence of temperature or by a lapse of time, and removing the mould. FIG. 6 shows a cross-section of a portion of a component of which a surface 5 has been provided with an anti-reflection grating 40 in this way. The synthetic material layer is denoted by 43 and the grating grooves and intermediate strips are denoted by 41 and 42, respectively.

If an optical component itself is manufactured by means of, for example a replica process, an anti-reflection grating may be provided simultaneously with shaping of the component so that one process step less is required. To this end the moulds used are not only provided with a profile corresponding to a desired surface profile of the component, but also with a grating structure. The grating structure is then no longer provided in an extra layer, as in FIG. 6, but in the component material 3, as in FIGS. 2 and 3.

Figure 7:
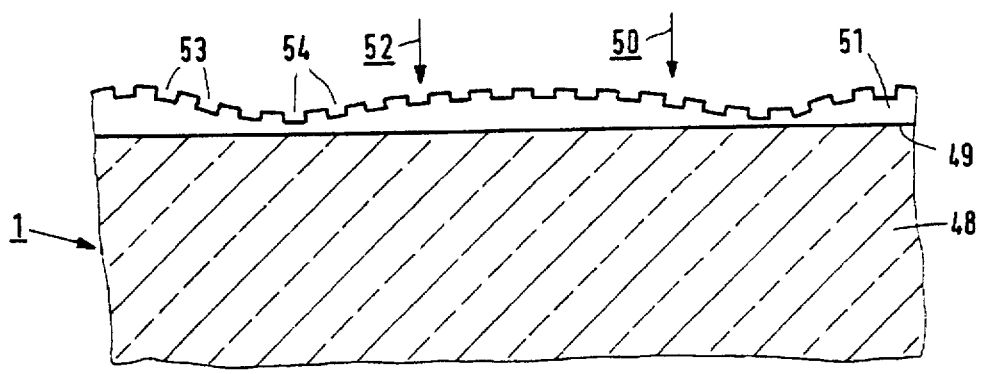
FIG. 7 shows a small portion of a lens having an aspherical surface and an anti-reflection grating.

In optical systems, notably in optical scanning devices, lenses having aspherical surfaces are used, i.e. surfaces whose fundamental shape is spherical but whose real shape has small deviations so as to correct for aberrations of the fundamental shape of the lens. As described in U.S. Pat. No. 4,668,056 such an aspherical surface is preferably formed by a thin layer of transparent synthetic material provided on the fundamental lens shape, in which layer the aspherical profile is provided by means of a mould. This mould may also be provided with a grating structure so that forming the aspherical surface and rendering this surface antireflective can be effected simultaneously. FIG. 7 shows in a cross-section a small portion of a lens component having an aspherical surface 50. This surface is the external surface of a thin synthetic material layer 51 which is provided on the surface 49 of the fundamental lens shape 48. An anti-reflection grating 52 with grating grooves 54 and intermediate strips 53 is provided on the aspherical surface 50. It is to be noted that the term aspherical used in this context has a wide meaning and is not limited to a concave or convex lens surface but may also be a surface having an infinitely large radius of curvature and/or the surface of a component not being a lens.

For providing anti-reflection gratings on an optical component by means of moulds, an injection-moulding process or a pressing process may be used instead of the replica process mentioned hereinbefore. The phase gratings may also be provided by pressing or by a photolithographic process, i.e. by illumination via a mask and subsequent etching.

Figure 8:
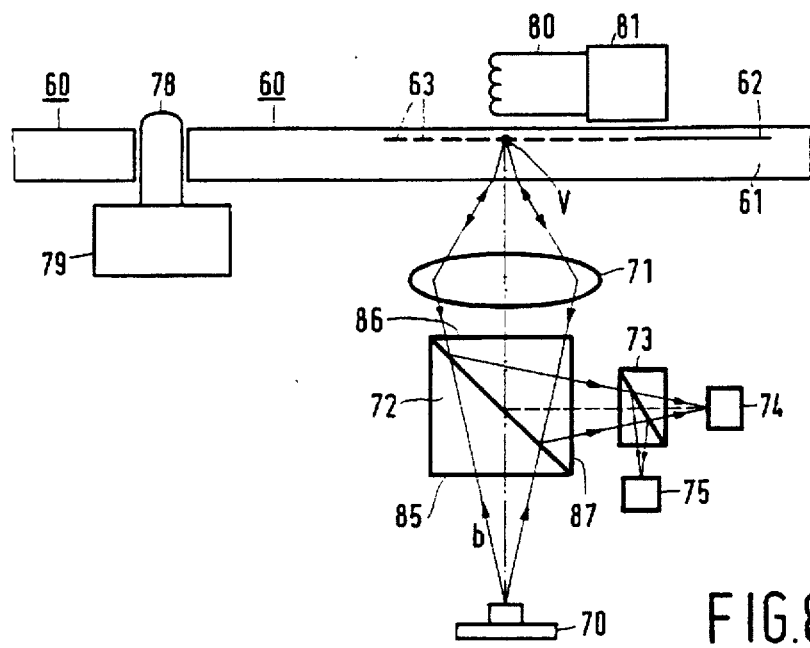
FIG. 8 shows an optical scanning device in which optical components according to the invention can be used.

A device in which one or more optical components according to the invention can be used to great advantage is a scanning device for magneto-optical record carriers, an embodiment of which is shown diagrammatically in FIG. 8. In this Figure a round, disc-shaped record carrier 60 is shown in a radial cross-section. This record carrier has a transparent substrate 61 which is provided with a magnetic recording layer 62 divided into tracks 63. The scanning device comprises a radiation source 70, for example a diode laser which supplies a scanning beam b. This beam is focused by an objective system 71 to a scanning spot V in the information plane 62. By rotating the record carrier about a shaft 78 driven by a motor 79, a track can be scanned. By moving the record carrier and the scanning spot in a radial direction with respect to each other, all tracks can be scanned. If the record carrier is already provided with information which is coded in a succession of magnetic domains (not shown), the scanning beam is modulated with this information, i.e. the state of polarization of the beam is modulated in time in conformity with the succession of the magnetic domains. The beam reflected by the record carrier traverses the objective system and is reflected by a beam-separating prism 72 to a radiation-sensitive detection system which converts the modulated beam into an electric signal representing the information which has been read. A differential detection is preferably used in this case. To this end the beam from the prism 72 is split by a polarization-sensitive beam splitter 73 into two sub-beams which are incident on separate detectors 74 and 75.

To be able to write information, a magnetic field is provided across the record layer, notably at the location of the scanning spot V. This magnetic field is generated by a coil 80 and an energizing circuit 81 for this coil. Either the scanning beam or the magnetic field may then be modulated in conformity with the information to be written. For further details relating to the construction and operation of a magneto-optical scanning device, reference is made to, inter alia European Patent Application 0383386.

Particularly when a diode laser is used as a radiation source, a maximum possible quantity of the radiation supplied by this laser should reach the scanning spot and ultimately the detectors so as to obtain a sufficiently large signal-to-noise ratio in the signal which has been read. Since the information is read on the basis of detection of a change of polarization, it should further be prevented that the scanning beam is subject to an extra change of polarization. By implementing the components of the scanning device in accordance with the present invention, both conditions can be satisfied. The components primarily intended for this implementation are the objective system 71 which preferably comprises a single-sided or double-sided aspherical lens element, a collimator lens which may be present between the radiation source and the objective system, or the prism 72. The surfaces 85, 86 and 87 of this prism may be provided with an anti-reflection grating in which the grating strips of the gratings on the surfaces 85 and 87 effectively have the same direction which is effectively perpendicular to the direction of the grating strips on the surface 86.

The invention may also be used in scanning devices other than magneto-optical devices such as scanning devices from which information can be read only. In such scanning devices the elements 80 and 81 are absent and only one information detector is used. The polarization neutral beam separator 71 of FIG. 8 is then often replaced by the combination of polarization-sensitive beam splitter (PBS) and a λ/4 plate as described in, inter alia the article "The optical scanning system of the Philips VLP record player" in "Philips Technical Review", vol. 33, 1973, no. 7, pp. 186–189. By using this combination it is prevented that radiation reflected by the record carrier returns to the diode laser so that noise would be produced in the information signal which has been read. However, it should be ensured that there are no extra polarization rotations in the device.

Figure 9:
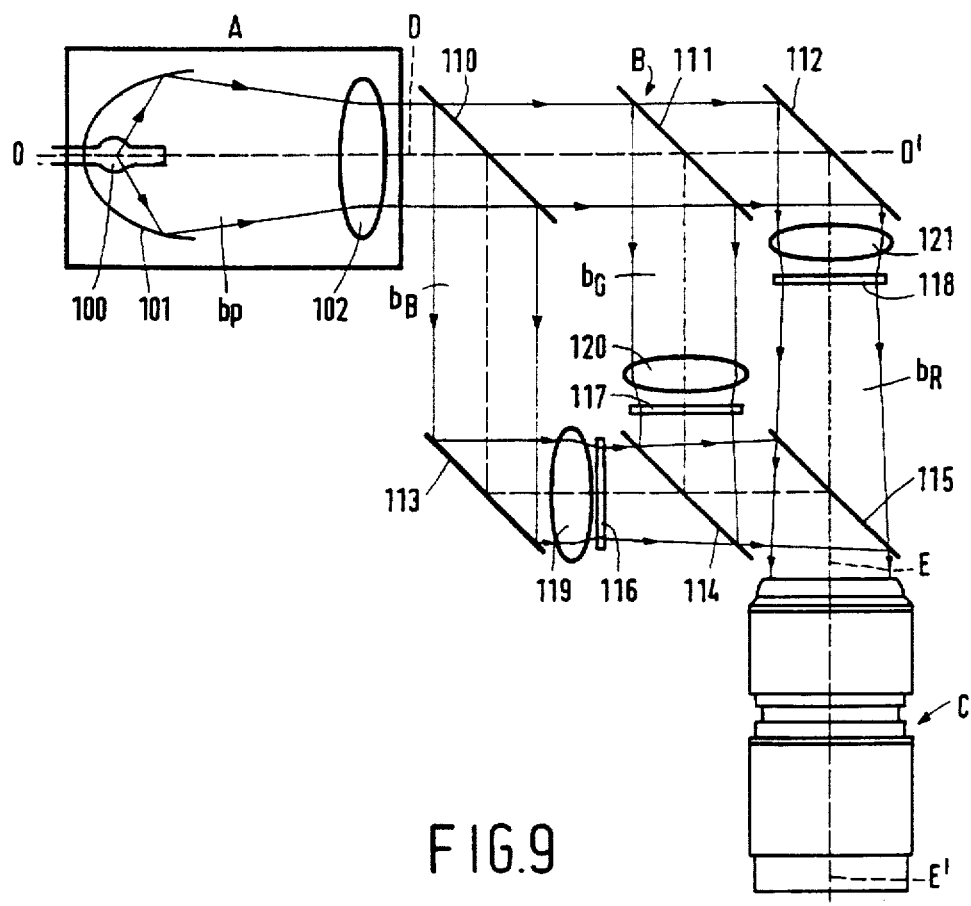
FIG. 9 shows a colour image projection apparatus in which optical components according to the invention can be used.

Another important use of the invention relates to image projection systems having at least one liquid crystalline display panel for generating an image to be projected, for example a colour projection television apparatus. FIG. 9 shows diagrammatically an embodiment of such an apparatus. This apparatus comprises three main sections: an illumination system A, a display system B and a projection lens system C, for example a zoom lens. The illumination system comprises a lamp 100, a reflector 101 and a condensor lens 102 and supplies a projection beam $b_p$. Its principal axis is in alignment with the optical axis DD' which is first divided into three sub-axes in the embodiment shown for colour projection, which sub-axes are later joined to one optical axis coinciding with the optical axis EE' of the projection lens system.

The beam from the illumination system A is incident on a colour-selective reflector 110, for example a dichroic mirror which reflects, for example the blue colour components $b_B$ and passes the rest of the beam. This beam portion reaches a second colour-selective reflector 111 which reflects the green colour component 69 and passes the remaining red colour component $b_R$ to a reflector 112 which reflects the red beam towards the projection lens system. The reflector 112 may be a neutral reflector or a reflector optimized for red light. The blue beam is reflected by a neutral or blue-selective reflector 113 towards a display panel 116 in the form of a liquid crystal display panel. This panel is electronically driven in known manner so that the blue component of the image to be projected appears on this panel. The beam modulated with the blue information reaches the projection lens system C via a colour-selective reflector 114 which passes the blue beam and reflects the green beam and a further colour-selective reflector 115 which reflects the blue beam. The green beam $b_G$ traverses a second display panel 117 where it is modulated with the green image component and is then reflected successively by the colour-selective reflectors 114 and 115 towards the projection lens system C. The red beam $b_R$ traverses a third display panel 118 where it is modulated with the red image component and subsequently reaches the projection lens system via the colour-selective reflector 115.

The blue, red and green beams are superimposed at the entrance pupil of this lens system where a colour image is produced which is imaged in a magnified form by this system on a projection screen (not shown in FIG. 9).

Additional lenses 119, 120 and 121 may precede the display panels 116, 117 and 118, which lenses ensure that all radiation from the exit face of the illumination system is concentrated in the entrance pupil of the projection lens system L.

For further details about LCD image projection devices reference is made to U.S. Pat. Nos. 5,235,444; 5,098,184 and 5,184,248. As described in these Patents, the image information of an LCD panel can be visualized by means of linearly polarized light or circularly or elliptically polarized light. In the latter two cases the direction of rotation of the light is changed or not changed or the ratio between the elliptical axes is changed or not changed, dependent on the image contents of a pixel.

LCD panels have a low efficiency, inter alia due to their drive electronics, for example only 10% of the radiation incident on a panel is passed to the projection lens system. This system images the panel in a magnified manner so that not only the lamp 100 should have a sufficiently high intensity but also a minimum number of reflections should occur in the apparatus so as to have still sufficient light intensity per surface unit on the projection screen. For this reason all components in each chrominance channel passing light of the colour associated with this channel should have surfaces which are made antireflective as much as possible. To this end the relevant components may be provided with anti-reflection gratings instead of the hitherto customary anti-reflection coatings.

If the image information of the LCD panels is visualized by means of linearly polarized light whose direction of polarization is parallel to the faces of the LCDs and extends at an angle of 45° to its sides so as to obtain a good contrast in the projected image, the light incident on the components in the radiation paths behind the LCD panels, such as the dichroic mirrors 114, 115 and the entrance surface of the projection lens system C has both TM and TE-polarized light. These elements may then be implemented as described in the present invention. Also if the image information of the LCD panels is visualized by means of circularly or elliptically polarized light, both the entrance face and the exit face of components of the apparatus which should pass this light may be provided with an anti-reflection grating according to the invention. These components may be present both in the illumination section, i.e. upstream of the LCD panels, and in the projection section, i.e. downstream of the LCD panels.

It is to be noted with reference to FIG. 9 that this Figure shows only one possible embodiment of the image display system B. The illumination system according to the invention may be combined with numerous other image display systems. The colours may be split up and combined with, for example compact colour-splitting prisms instead of with separate dichroic mirrors.

A colour image projection may also be realised by means of only one panel which itself splits the colours and is irradiated by a beam of white light. The invention may of course also be used in a projection apparatus for only one colour and having only one display panel. In addition to a television image, other information such as graphic information or numerical information may alternatively be projected. Moreover, the use of the invention is not limited to a projection apparatus. Generally, the invention may be used in any optical apparatus in which no reflection must occur and in which polarization means are used.

We claim:

1. An optical transmissive component having an entrance surface and an exit surface for optical radiation, in which one of the surfaces is provided with an anti-reflection grating, characterized in that a second surface is provided with a second anti-reflection grating and in that the grating strips of the first grating extend essentially perpendicularly to those of the second grating in corresponding areas of the first and the second surface.

2. An optical transmissive component as claimed in claim 1, characterized in that the two anti-reflection gratings are linear gratings having straight grating strips.

3. An optical transmissive component as claimed in claim 1, having a curved and rotationally symmetrical entrance and exit surface, characterized in that the grating strips of one of the anti-reflection gratings are circular and those of the other anti-reflection grating extend radially and essentially perpendicularly to the axis of symmetry.

4. An optical transmissive component as claimed in claim 3, characterized in that the grating having the radially extending grating strips is divided into a plurality of rings and in that the rings succeeding each other from the centre towards the edge of the grating have an increasing number of grating strips.

5. An optical transmissive component as claimed in claim 1, characterized in that the anti-reflection gratings are profile gratings.

6. An optical transmissive component as claimed in claim 5, characterized in that the anti-reflection gratings are present in thin layers of a transparent synthetic material, which layers are provided on the entrance surface and the exit surface, respectively.

7. An optical transmissive component as claimed in claim 5, characterized in that the anti-reflection gratings are provided in the entrance surface itself and the exit surface itself, respectively.

8. An optical system for guiding and performing operations on a radiation beam, which system has at least one discrete component, characterized in that at least one of the discrete components is a component as claimed in claim 1.

9. An optical scanning device for scanning an optical record carrier and provided with a radiation source, a radiation-sensitive detection system and an optical system for guiding radiation from the radiation source to the detection system via the record carrier, characterized in that the optical system is a system as claimed in claim 8.

10. A colour image projection apparatus comprising three primary image sources for supplying three differently coloured images of one scene, a beam recombination device for combining three sub-beams from the image sources to one colour beam and a projection lens system for projecting said beam on a projection screen, characterized in that at least the beam recombination device comprises at least a component as claimed in claim 1.

* * * * *